Fig. 2a
Fig. 2b
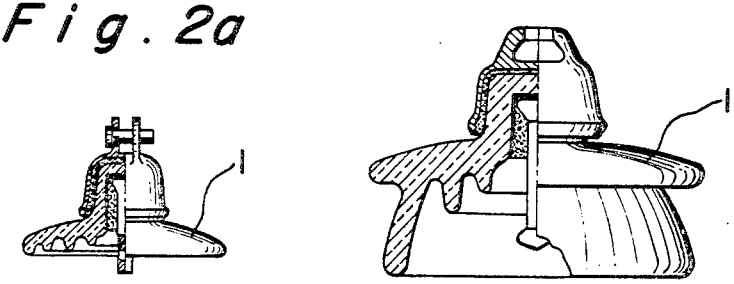
Fig. 2c
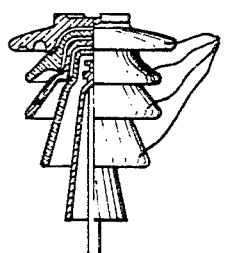
Fig. 2d
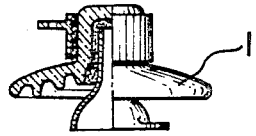
Fig. 2f
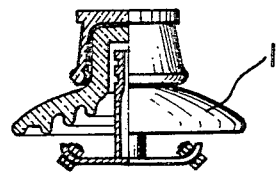
Fig. 2e
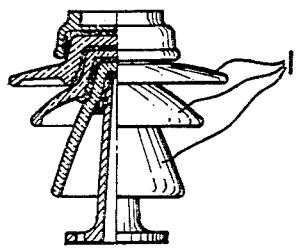
Fig. 2g
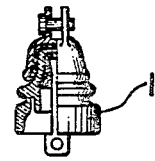
INVENTOR
TSUTOMU MORIYA
BY Stevens, Davis, Miller & Mosher
ATTORNEYS United States Patent Office 3,479,861
Patented Nov. 25, 1969

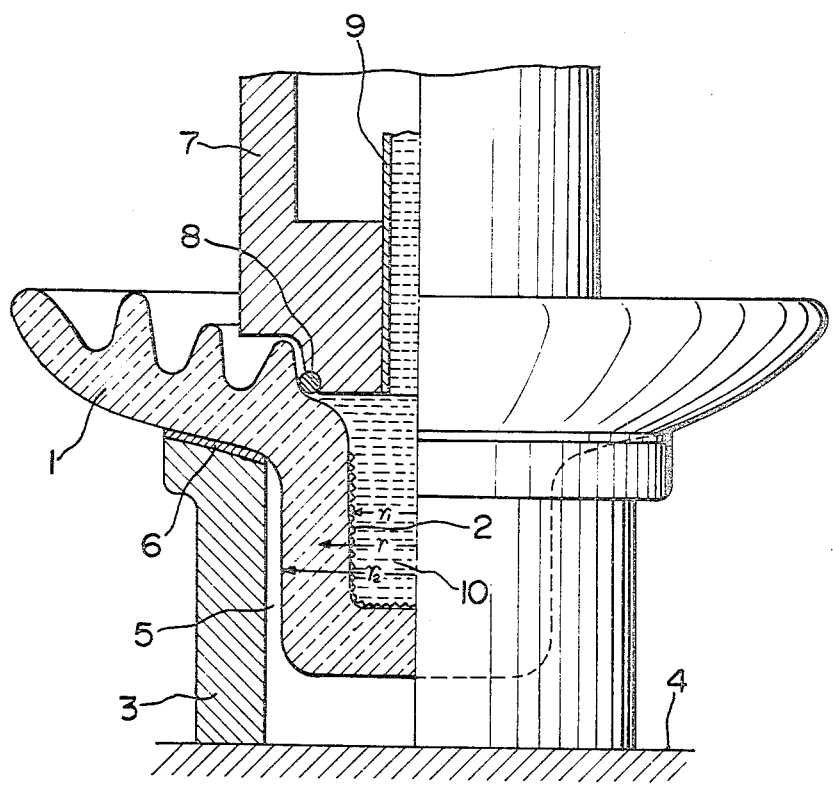

3,479,861
METHOD OF DETECTING DEFECTS IN A HEAD PORTION OF A PORCELAIN SHELL OF A SUSPENSION INSULATOR
Tsutomu Moriya, Nagoya, Japan, assignor to NGK Insulators, Ltd., Nagoya, Japan
Filed Sept. 5, 1967, Ser. No. 665,424
Claims priority, application Japan, Feb. 15, 1967, 42/9,258
Int. Cl. G01m 3/02
U.S. Cl. 73—37                   3 Claims

ABSTRACT OF THE DISCLOSURE

A method for testing porcelain insulators by feeding a pressurized fluid or other elastic substances into a cavity formed in a head portion of a porcelain shell of a suspension insulator. The pressure is defined by the following formula $$\sigma_t = P\{r_1^2/(r_2^2 - r_1^2) + r_1^2 r_2^2 / r^2 (r_2^2 - r_1^2)\}$$

where, P is the pressure of the fluid fed into the cavity; $\sigma_t$ is the stress produced by the pressure P in the peripheral direction of the head portion; $r_1$ and $r_2$ are the inner and outer radii of the head portion, respectively; and $r$ is any radius located between $r_1$ and $r_2$. The pressure P is selected such that the stress $\sigma_t$ corresponds to the practical load conditions acting upon the suspension insulator. This method is effected after firing of the porcelain shell and before its assembly.

The present invention relates to a method of detecting defects in a head portion of a porcelain shell of a suspension insulator.

In general, the porcelain shell of a suspension insulator comprises a cylindrical head portion closed at one end to form a cavity therein and formed integral at its open end with a flared shed portion with corrugations, and a metal member secured in the cavity and outside the head portion and supporting the suspension insulator.

Heretofore, during the manufacture of the porcelain shell of the suspension insulator it has not been possible to completely avoid producing minute defects or to occlude foreign matters in the porcelain shell. It is a matter of course that the presence of such minute defects or foreign matters in the porcelain shell, particularly in the head portion, causes deterioration of mechanical and electrical characteristics of the porcelain shell.

Assembled suspension insulators are subjected high voltage tests and tension tests as a routine matter specified in almost all standards requirements.

But, it is usually difficult to detect completely the above-mentioned defects or foreign matters in the porcelain shells. All the porcelain shell should withstand the guaranteed mechanical and electrical strength which is far higher than the proof load defined by the standard, i.e. which is about two times higher than the tension proof load test value defined by the standard specification. It is obvious that the proof tests defined by the above-mentioned standard specification do not guarantee the fact that all of the suspension insulators have the above-mentioned guaranteed mechanical and electrical breaking strength.

It is not practical to apply the load up to guaranteed mechanical strength to all assembled suspension insulators. In practice, however, proof test with such a level of load could not be applied since such test results in that the metal support member of the suspension insulator is subjected to so heavy load as to produce a permanent strain thereon and hence change the initial dimension thus disqualifying the insulators for service in the line.

The principal object of the invention is to eliminate the above-mentioned disadvantage inherent to the conventional tension proof load test.

In general, if the suspension insulator is used under tension, the porcelain shell is subjected to the mechanical stress caused by the tensile force acting upon the surface of the cavity from the metal support member of the suspension insulator through cement. The inventor has found out that the above-mentioned tension proof load test can be replaced by a test equivalent thereto and in which the internal pressure equivalent in effect to the value and distribution of the stress to be subjected in practice to the porcelain shell of the assembled suspension insulator assembly may be applied in the form of fluid under pressure to the entire inner surface of the cavity in which the metal support member is secured, and that said internal pressure may even exceed the value corresponding to the above mentioned high mechanical guaranteed strength.

The invention is based on the above-mentioned recognition and provides a method of detecting defects in a head portion of a porcelain shell of a suspension insulator, wherein a pressurized fluid or a pressurized elastic substance having no anisotropy in pressure transmission is fed into a cavity formed in the head portion in which a metal support member is secured.

For a better understanding of the invention, reference is taken to the accompanying drawings, in which:

FIG. 1a is a front elevation and partly a sectional view of an embodiment of the method according to the invention;

FIGS. 2a–2g show a front elevation and partly a sectional view of various types of suspension insulators to which the method according to the invention may be applied.

Figure 1B:
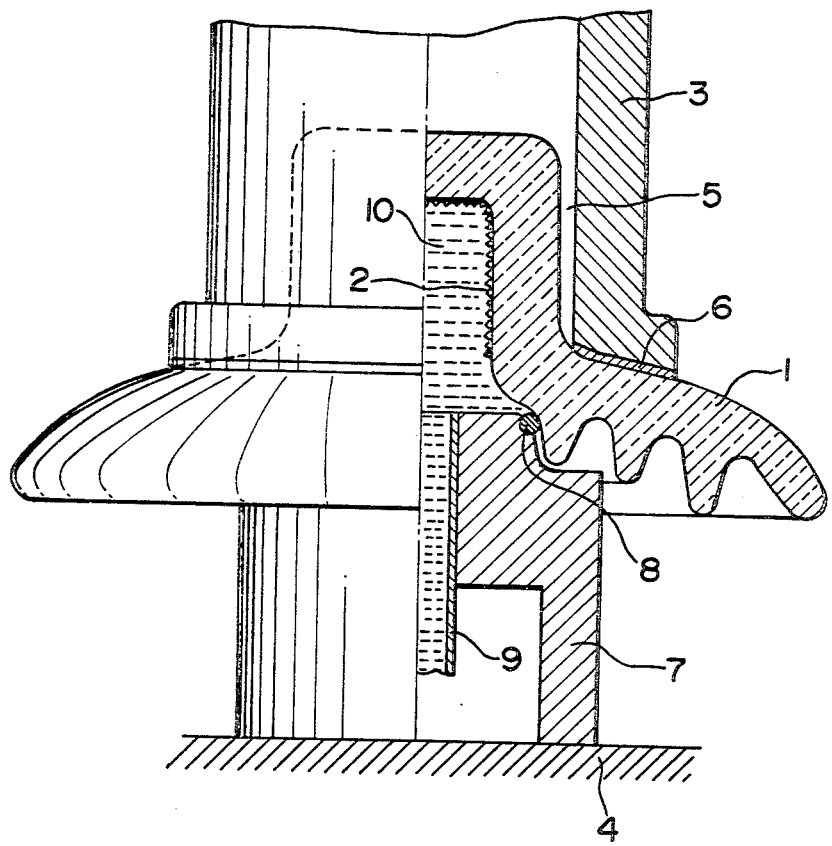
FIG. 1b shows similarly to FIG. 1a a front elevation and partly a sectional view of another embodiment of the method according to the invention.

Referring to FIG. 1a a porcelain body 1 of a suspension insulator in upside-down state comprises a cylindrical head portion closed at one end to form a cavity 2 and formed integral at its open end with a flared shed portion with corrugations. The cavity 2 is adapted to secure therein a metal support member for supporting the suspension insulator (not shown).

In an embodiment of the invention shown in FIG. 1a use is made of a jig comprising a cylindrical support member 3 secured to a stationary base 4. The shed portion of the porcelain shell 1 is placed on the upper peripheral end of the cylindrical support member 3 so as to surround the head portion of the porcelain shell 1 with the cylindrical support member 3 with a free space 5 being formed therebetween. Between the cylindrical support member 3 and the shed portion of the porcelain shell 1 is inserted a cushion 6 made of rubber, aluminium or copper or the like. The cavity 2 is closed by another support member 7 pressed against the upper peripheral edge of the cavity 2 through an O-ring 8 made of rubber and inserted between the lower peripheral edge of support member 7 and the upper peripheral edge of the cavity 2. The O-ring 8 serves to close the cavity 2 by means of support member 7 in a fluid-tight manner. A fluid supply conduit 9 is extended through support member 7 and connected to a fluid supply source (not shown).

Then, a fluid 10 under pressure is passed through the conduit 9 into the cavity 2.

In another embodiment of the invention shown in FIG. 1b in which the porcelain body 1 of a suspension insulator is tested under a normally supported state as shown in the drawing.

In the present embodiment, the shed portion of the porcelain shell 1 is placed on the upper peripheral edge of support member 7 secured to the stationary base 4. The O-ring 8 is inserted between the upper peripheral edge of support member 7 and the lower peripheral edge of the cavity 2, and serves to close the cavity 2 by means of support member 7 in a fluid-tight manner. The cylindrical support member 3 is pressed against the shed portion of the porcelain body 1 through the cushion 6 made of rubber, aluminium or copper or the like. Also in this embodiment a free space 5 is formed between the cylindrical support member 3 and the cylindrical head portion of the porcelain shell 1. The fluid supply conduit 9 is extended through support member 7 secured to the stationary base 4 and connected to the fluid supply source (not shown).

The fluid 10 under pressure is passed through the conduit 9 into the cavity 2.

In the above mentioned embodiments if the fluid 10 is fed under pressure into the cavity 2 the pressure is transmitted to the all inner surface of the cavity 2. For this internal pressure, the head portion of the porcelain body 1 is subjected to a tensile stress. Thus a stress $\sigma_t$ is produced in the peripheral direction of the head portion of the porcelain shell 1. The stress $\sigma_t$ can be represented by the following formula $$\sigma_t = P\{r_1^2/(r_2^2 - r_1^2) + r_1^2 \cdot r_2^2 / r^2(r_2^2 - r_1^2)\}$$

where, P is a pressure transmitted into the cavity 2 from the fluid 10 fed through the conduit 9; $r_1$ and $r_2$ is the inner and the outer radius, respectively, of the head portion of the porcelain shell 1; and $r$ is any radius located between $r_1$ and $r_2$.

If the pressure P in the above formula is selected such that the stress $\sigma_t$ caused by the pressure P corresponds to the above mentioned guaranteed mechanical strength and the fluid 10 is fed under such selected pressure P into the cavity 2, it is easily possible to know whether or not the strength of the porcelain body 1 can satisfactorily withstand the above-mentioned mechanical proof value. In this case the metal support member for supporting the suspension insulator is not yet secured in the cavity 2 so that the metal support member is not subjected to so heavy load as to produce a permanent strain therein and hence no failure of the metal support member occurs and not decreases the strength thereof.

As explained hereinbefore the present invention provides an easy way of applying such heavy load as heretofore not realized to the porcelain shell 1 by merely supplying the pressure P defined by the above formula, and hence distributing the stress on the head portion of the porcelain body 1 in correspondence with the practical load condition acting upon the suspension insulator. Thus the test method according to the invention can guarantee the fact that all of the suspension insulator products have sufficiently high mechanical proof strength.

The method according to the invention may be applied various types of suspension insulators as shown in FIGS. 2a-2g.

The elastic substance having no anisotropy in pressure transmission comprises a substance selected from a group consisting of rubber, synthetic resin, lead, clay, sand and the like.

As above mentioned, the method according to the invention provides a way of testing the porcelain shell before assembly, and further provides the important advantages that a number of suspension insulators can be tested in a simple and easy manner, that the loss occurring in case of assembling the bad porcelain shell can be avoided, and that an internal pressure withstand load test is applied as the load exceeding the general guaranteed mechanical strength, and hence use is made of a sufficiently high mechanical proof strength corresponding to the practical load acting upon the suspension insulator can be applied to the porcelain shell without damaging it.

Moreover, the method according to the invention makes it possible to give damages, if desired, to any porcelain body including serious defects or foreign matters in the head portion and to select such damaged porcelain shell from the porcelain bodies subjected to the test thereby avoiding the loss in case of assembling the damaged porcelain shell into the suspension insulator. Moreover, the test method according to the invention can be effected without danger, since the head portion of the porcelain body is broken in the space 5 surrounded by the cylindrical support member 3.

It will be obvious that the invention is not restricted to the embodiments described above and that those skilled in the art may be applied many variations within the scope of the invention.

What I claim is:

1. A method of detecting defects in a head portion of a porcelain shell of a suspension insulator, comprising feeding a pressurized fluid into a cavity formed in the head portion, and applying the pressure of the fluid throughout the inner surface of the cavity, said pressure of the fluid fed into said cavity being so selected that the stress produced by said pressure in the peripheral direction of the head portion and at any point therein having a radius intermediate inner and outer radii of the head portion and represented by the following formula corresponds to the general mechanical proof strength of the porcelain body $$\sigma_t = P\{r_1^2/(r_2^2 - r_1^2) + r_1^2 \cdot r_2^2 / r^2(r_2^2 - r_1^2)\}$$

where, P is the pressure of the fluid fed into the cavity; $\sigma_t$ is the stress produced by the pressure P in the peripheral direction of the head portion of the porcelain body; $r_1$ and $r_2$ are the inner and the outer radii of the head portion of the porcelain shell, respectively; and $r$ is any radius located between $r_1$ and $r_2$.

2. A method of detecting defects in a head portion of a porcelain shell of a suspension insulator, comprising feeding a pressurized elastic substance having no anisotropy in pressure transmission into a cavity formed in the head portion, and applying the pressure of the elastic substance throughout the inner surface of the cavity, and said pressure of the elastic substance fed into said cavity is selected such that the stress produced by said pressure in the peripheral direction of the head portion and at any point therein having a radius intermediate inner and outer radii of the head portion and represented by the following formula corresponds to the general mechanical proof strength of the porcelain body $$\sigma_t = P\{r_1^2/(r_2^2 - r_1^2) + r_1^2 \cdot r_2^2 / r^2(r_2^2 - r_1^2)\}$$

where, P is the pressure of the elastic substance fed into the cavity; $\sigma_t$ is the stress produced by the pressure P in the peripheral direction of the head portion of the porcelain body; $r_1$ and $r_2$ are the inner and the outer radii of the head portion of the porcelain shell, respectively; and $r$ is any radius located between $r_1$ and $r_2$.

3. A method of detecting defects in a head portion of a suspension insulator as claimed in claim 2 wherein said elastic substance having no anisotropy in pressure transmission comprises a substance selected from the group consisting of rubber, synthetic resins, lead, clay and sand.

References Cited

UNITED STATES PATENTS 1,796,489   3/1931   Sturcke _____ 73—37 XR

LOUIS R. PRINCE, Primary Examiner

WILLIAM A. HENRY II, Assistant Examiner